(12) United States Patent
Klein et al.

(10) Patent No.: US 10,774,552 B2
(45) Date of Patent: Sep. 15, 2020

(54) SUPPORT

(71) Applicant: BESSEY Tool GmbH & Co. KG, Bietigheim-Bissingen (DE)

(72) Inventors: Thomas Klein, Besigheim (DE); Gerhard Kloepfer, Pleidelsheim (DE)

(73) Assignee: BESSEY Tool GmbH & Co. KG, Bietigheim-Bissingen (DE)

( * ) Notice: Subject to any disclaimer, the term of this patent is extended or adjusted under 35 U.S.C. 154(b) by 0 days.

(21) Appl. No.: 16/001,044

(22) Filed: Jun. 6, 2018

(65) Prior Publication Data

US 2018/0371773 A1 Dec. 27, 2018

Related U.S. Application Data

(63) Continuation of application No. PCT/EP2016/082700, filed on Dec. 27, 2016.

(30) Foreign Application Priority Data

Jan. 13, 2016 (DE) .......................... 10 2016 100 487

(51) Int. Cl.
*E04G 25/00* (2006.01)
*E04G 25/06* (2006.01)
(Continued)

(52) U.S. Cl.
CPC ........ *E04G 25/063* (2013.01); *E04F 21/1833* (2013.01); *F16B 7/14* (2013.01); *E04G 2025/045* (2013.01); *F16B 2007/16* (2013.01)

(58) Field of Classification Search
CPC .......... B62J 2001/085; B62J 1/00; B62J 1/06; B62K 19/36
(Continued)

(56) References Cited

U.S. PATENT DOCUMENTS 2,903,227 A * 9/1959 Kalb Key ................. A47F 5/06
                                                   248/200.1
4,733,844 A * 3/1988 Molloy ............... E04F 21/1805
                                                   248/354.1
(Continued)

FOREIGN PATENT DOCUMENTS

CN          2407170          11/2000
CN         201934451          8/2011
(Continued)

OTHER PUBLICATIONS

PIHER, "Katalog 2014", 2014, cover, pp. 1, 2, 5, and 6, English language translation not available.
(Continued)

*Primary Examiner* — Steven M Marsh
(74) *Attorney, Agent, or Firm* — Lipsitz & McAllister, LLC

(57) ABSTRACT

A support is provided, comprising a first bar with a first abutment element, a second bar with a second abutment element, and a guiding device by which the first bar is displaceably guided on the second bar. An actuating device which acts on the first bar and which comprises an actuating element is arranged on the second bar. A displacement of the first bar in a first direction of displacement can be initiated by actuation of the actuating element. The first direction of displacement is a direction of increase in distance between the first abutment element and the second abutment element. The actuating device comprises a blocking device which blocks a displacement of the first bar in relation to the second bar in a second direction of displacement, which is opposite the first direction of displacement, at least when no active releasing action occurs at the blocking device.

46 Claims, 8 Drawing Sheets

(51) Int. Cl.
  *F16B 7/14*     (2006.01)
  *E04F 21/18*    (2006.01)
  *F16B 7/16*     (2006.01)
  *E04G 25/04*    (2006.01)

(58) Field of Classification Search
  USPC ......... 248/157, 161, 188.2, 188.5, 410, 420, 248/421, 423
  See application file for complete search history.

(56) References Cited

U.S. PATENT DOCUMENTS

| | | | |
|---|---|---|---|
| 4,928,916 A | | 5/1990 | Molloy |
| 5,228,810 A | * | 7/1993 | Seegmiller ............. E21D 15/42 248/354.3 |
| 6,152,434 A | | 11/2000 | Gluck |
| 6,176,639 B1 | | 1/2001 | Fratini et al. |
| 7,086,631 B2 | * | 8/2006 | Lee ....................... F16M 11/26 248/161 |
| 8,152,118 B2 | * | 4/2012 | Melic ................. E04G 21/3233 248/200.1 |
| 8,167,152 B1 | * | 5/2012 | Gatti ..................... E04B 2/7435 211/187 |
| 9,648,805 B2 | | 5/2017 | Nie et al. |
| 9,663,962 B1 | * | 5/2017 | Whittemore .......... E04G 21/243 |
| 2012/0034023 A1 | | 2/2012 | Wang et al. |
| 2015/0108728 A1 | | 4/2015 | Nie et al. |

FOREIGN PATENT DOCUMENTS

| | | |
|---|---|---|
| CN | 104564939 | 4/2015 |
| CN | 204704225 | 10/2015 |
| DE | 29601103 | 5/1996 |
| DE | 29605222 | 6/1996 |
| DE | 19749477 | 5/1999 |
| DE | 19805474 | 7/1999 |
| DE | 202012002195 | 5/2012 |
| EP | 0888485 | 4/2001 |
| WO | 9736069 | 10/1997 |

OTHER PUBLICATIONS

PIHER, "Multi Props" technical sheet, date unknown, 2 pages, [admitted prior art].
PIHER, "Herramientas De Sujecion—Clamping Tools", 2018, cover, pp. 9-17.

* cited by examiner

FIG.1
FIG.2
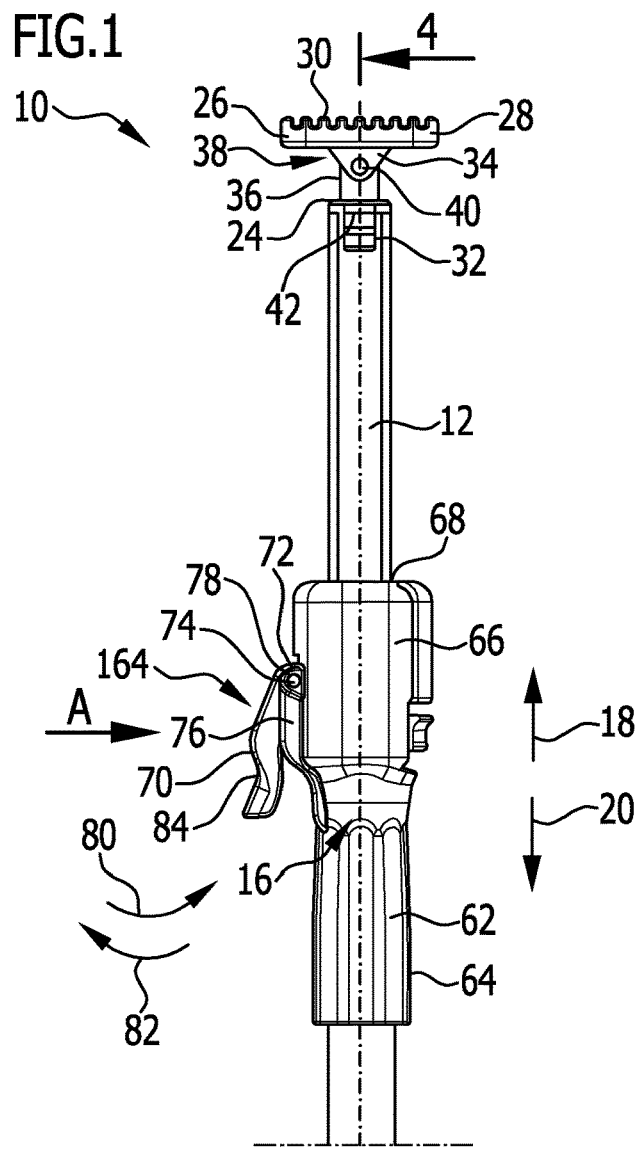
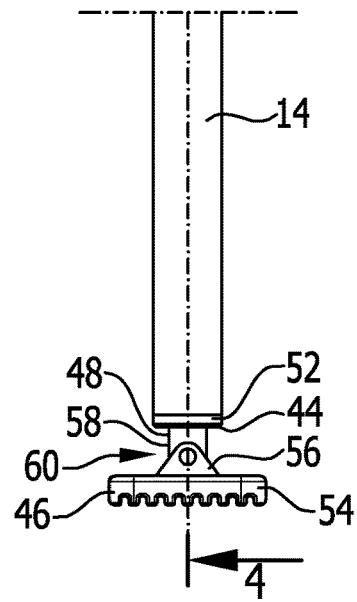
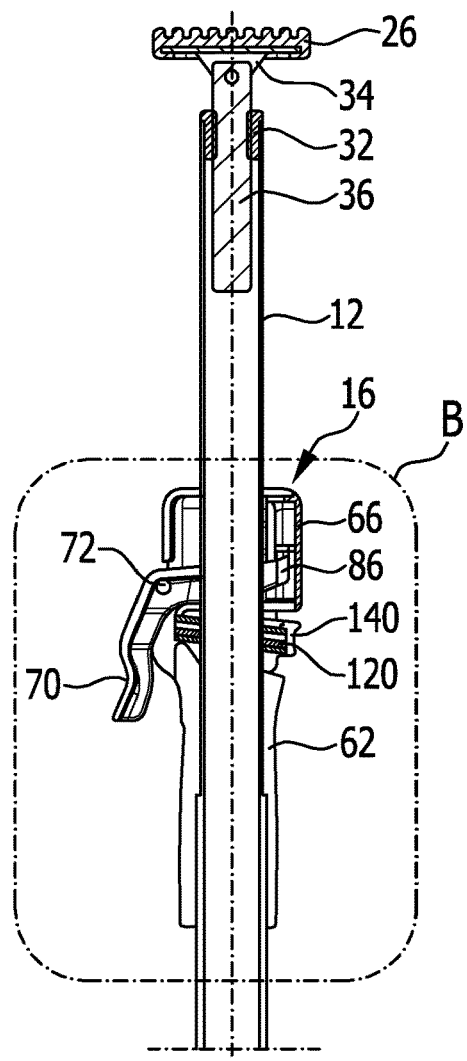
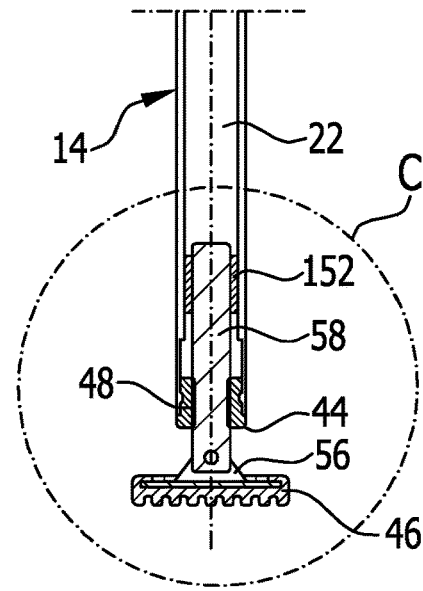

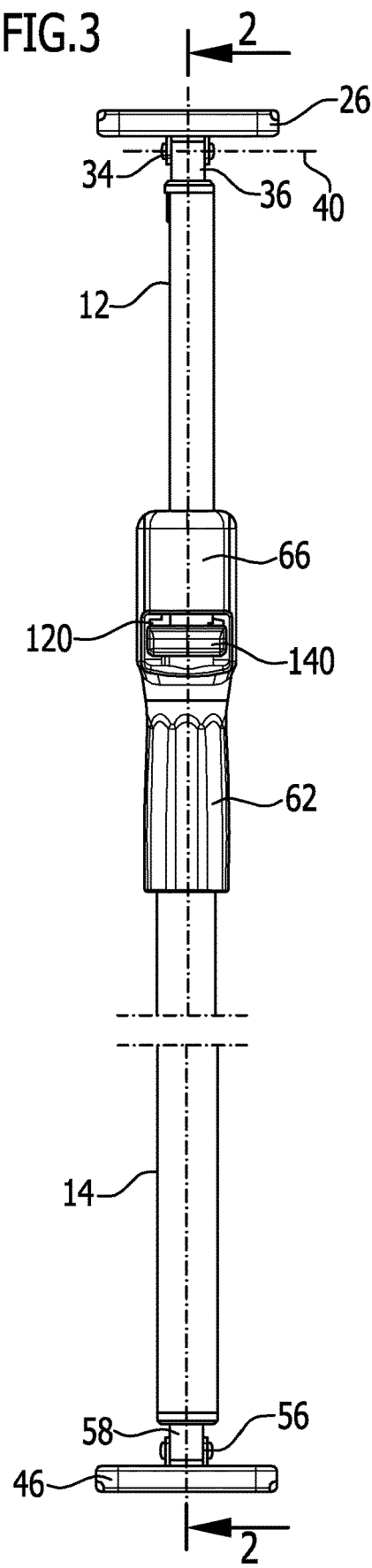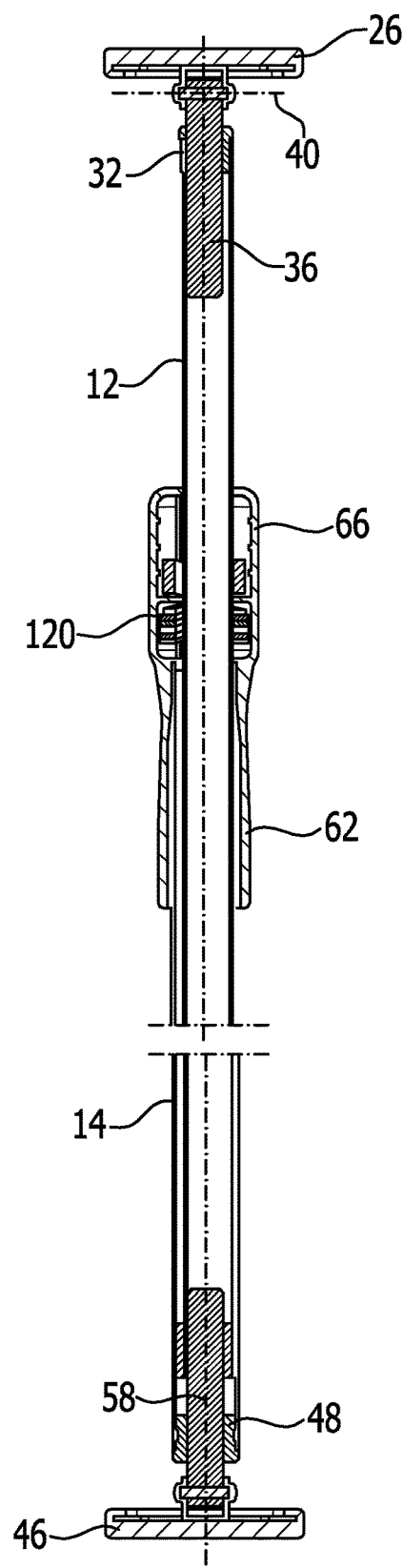

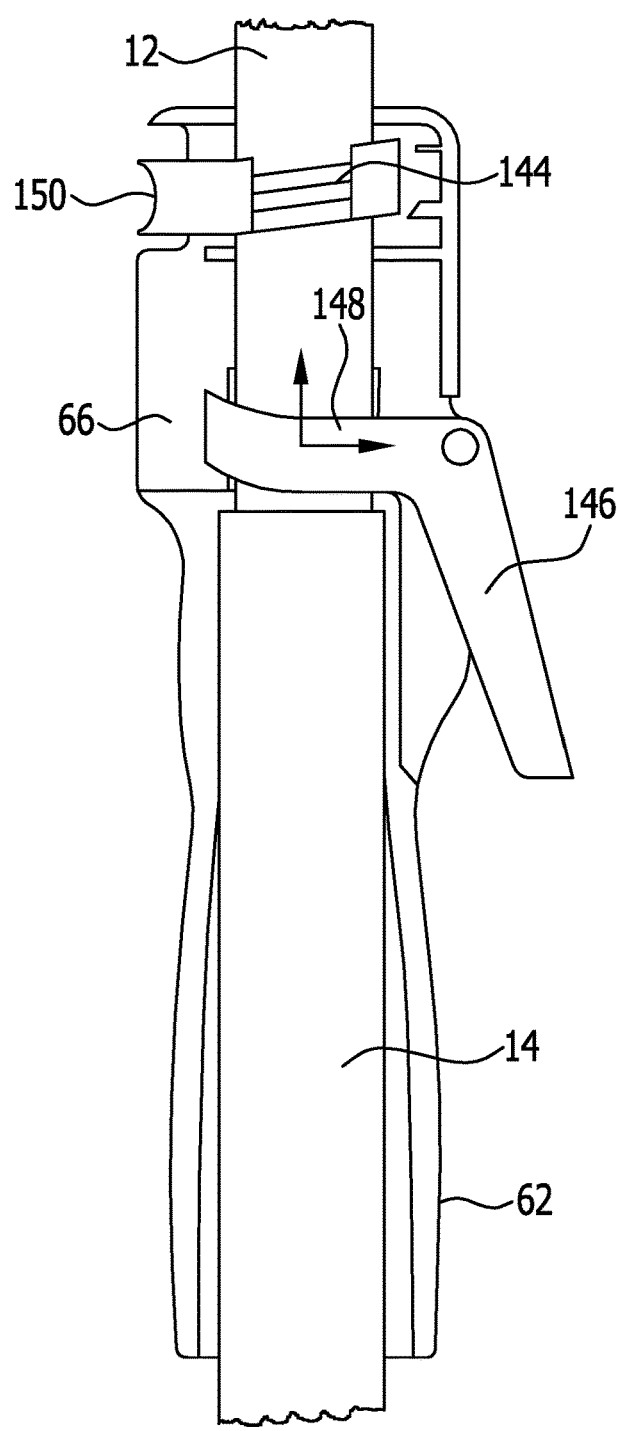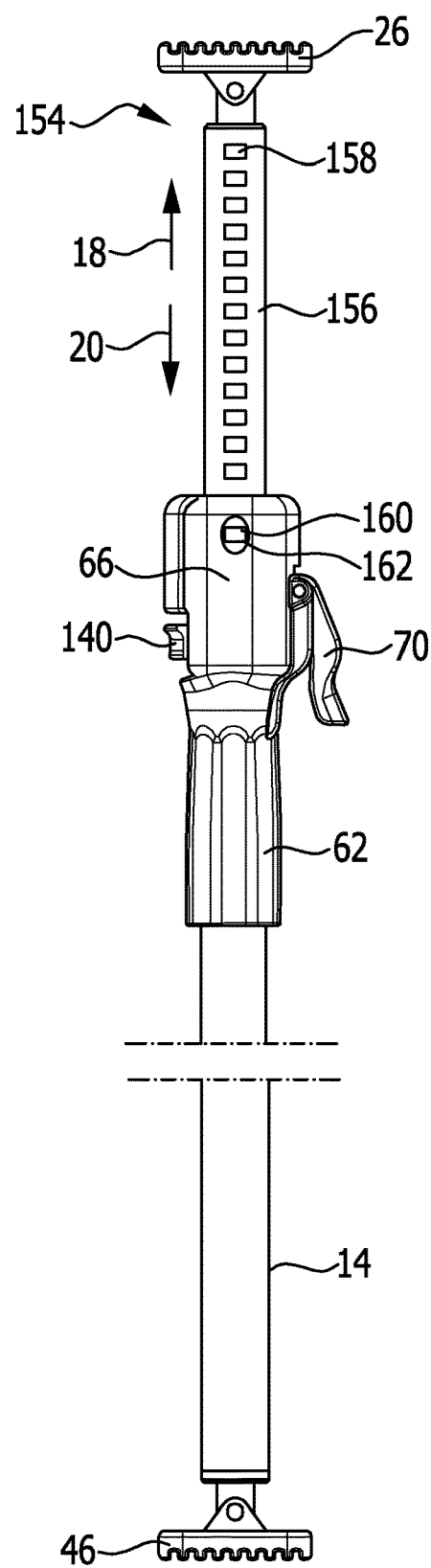

SUPPORT

This application is a continuation of international application number PCT/EP2016/082700 filed on 27 Dec. 2016 and claims the benefit of German application number 10 2016 100 487.1 filed on 13 Jan. 2016, which are incorporated herein by reference in their entirety and for all purposes.

BACKGROUND OF THE INVENTION

The invention relates to a support, comprising a first bar, a first abutment element which is held on the first bar by means of a first thread with a first thread direction, a second bar, a second abutment element which is held on the second bar by means of a second thread with a second thread direction, the first thread direction being opposite to the second thread direction, and a guiding device by which the first bar is displaceably guided on the second bar.

The company PIHER INDUSTRIAS PIQUERAS, S.A., Pol. Cantabria 1, C/Pescadores 6, 26009 Logrono, Spain, www.piher.com, sells a support under the designation "Multi Prop".

A prop is shown on pages 5 to 9 of the catalog "PIHER, www.piher.com, Catalog 2014".

A support device for objects such as ceiling panels, roof battens, machine components or the like, consisting of at least two telescoping tubes or a rod telescoping in at least one tube, wherein a first tube or the rod is displaceable in relation to the second tube, and wherein means are provided for locking the tubes or the tube and the rod to each other, is known from EP 0 888 485 B1. The first tube or the rod is movable in relation to the second tube over a first and a second distance, a gas pressure spring or coil spring arranged in the second tube and connected thereto being provided for the movement over the first distance, and a ratchet, rack, clamping holder or the like with a hand-operated advancing means being provided for the movement over the second distance.

A telescopic apparatus comprising an internal tube telescopically inserted in an external tube is known from US 2012/0034023 A1. A frame to which a lever is pivotally connected is arranged on the external tube. The lever comprises an element for insertion in depressions of the internal tube for locking the internal tube relative to the external tube.

A telescopic support comprising an external tube and a supporting part displaceable in the external tube is known from DE 296 01 103 U1. A releasable locking device is provided for preventing insertion of the extended supporting part.

A further support is known from U.S. Pat. No. 4,928,916.

With such a support, a supporting effect can be achieved at an object comprising a first wall and an opposite second wall. For example, the first abutment element is placed against the first wall, and the second abutment element is placed against the second wall. By rotating the combination of first bar and second bar, a corresponding force can be introduced owing to the threads having opposite directions. A supporting function is achieved at the object.

SUMMARY OF THE INVENTION

In accordance with an embodiment of the present invention, a support is provided which is easy to operate.

In accordance with an embodiment of the invention, a support has an actuating device which acts on the first bar and which comprises an actuating element being arranged on the second bar, it being possible for a displacement of the first bar in a first direction of displacement to be initiated by actuation of the actuating element, and the first direction of displacement being a direction of increase in distance between the first abutment element and the second abutment element, and wherein the actuating device comprises a blocking device which blocks a displacement of the first bar in relation to the second bar in a second direction of displacement, which is opposite to the first direction of displacement, at least when no active releasing action occurs at the blocking device.

By acting on the actuating device by means of the actuating element, the first bar can be brought into a position in which its associated first abutment element lies against a wall of an object. When the second abutment element lies against an opposite wall, the support is then pre-clamped on the object. By rotating the combination of first bar and second bar with the threads that have opposite directions, a final clamping with high force bearing capacity and force transmission can then be achieved.

The actuating device makes it possible to achieve displacement of the first bar in the direction of displacement by actuation of the actuating element. One-hand operability is, therefore, in principle, possible. In particular, an operator does, for example, not have to hold the combination of second bar and first bar with one hand and pull the first bar in the direction of displacement with the other hand; with the solution in accordance with the invention, it is possible to also operate the actuating element with the holding hand. With simplified operability, an increased range of use is thereby achieved.

The blocking device ensures that a displacement position achieved by actuation of the actuating element is maintained.

It is, in principle, also possible that in a clamped position the blocking device absorbs the load forces on the support.

It is expedient for the actuating element to be or comprise a lever element or to be coupled to a lever element which is arranged on the second bar for pivotal movement about a pivot axis. With such a lever element, a pump mechanism can be implemented in a simple way in order to bring about a displacement of the first bar in relation to the second bar in the first direction of the displacement, and, in particular, one-hand operability is achievable in a simple way. With a lever element mounted for pivotal movement, it is possible to act in a simple way on a push element, which is brought by the lever element into an advanced position on the first bar and in the advanced position is then displaced over a certain distance, whereby the first bar is, in turn, displaced relative to the second bar. In principle, it is possible for the actuating element to be an element separate from the lever element, which is then correspondingly coupled in a force-effective or moment-effective manner to the lever element. It is, for example, conceivable for the actuating element to be part of a motor such as an electric motor, which then acts on the lever element. In a constructionally advantageous embodiment, which makes a simple and compact construction of the support possible, the lever element is formed directly on the actuating element and is, for example, formed in one piece with it. A pivoting of the actuating element is then directly a pivoting of the lever element.

In particular, the pivot axis about which the lever element is pivotable is orientated transversely and preferably perpendicularly to the first direction of displacement. A displacement movement of the first bar in the first direction of displacement can thereby be initiated in a simple way, in particular, in a kind of pumping operation.

Furthermore, it is expedient for the actuating element and/or the lever element to be arranged on a holder which is fixed to the second bar. This results in a compact construction. One-hand operability is also achievable in a simple way.

A constructionally simple design results from a pivot bearing on which the actuating element and/or the lever element is mounted for pivotal movement being arranged on an outer side of the holder. An actuating element which an operator can access from an outer side, in order to bring about a displacement of the first bar in the first direction of displacement, in particular, in the manner of a pumping mechanism, can thereby be implemented in a simple way. The corresponding support can be easily manufactured and a compact construction is obtained.

It is expedient for the holder to be constructed as sleeve, for example, as hollow cylinder. The holder can then be used, in particular, also as guiding device or part of the guiding device for guiding the first bar on the second bar. Furthermore, owing to its construction as sleeve, it can form a closed housing for components of the actuating device so that these are arranged in a protected manner.

In particular, the holder has a through-opening through which the first bar passes. Guidance of the first bar on the second bar can thereby be implemented in a simple way. In particular, with corresponding formation of the recess, a sliding guidance of the first bar on the second bar is implemented by way of the holder. The guidance, in turn, can be implemented by corresponding adaptation of an outer cross section of the bar to the shape of the recess such that the first bar is rotationally fixedly guided with respect to the second bar. For example, a profile which is not rotationally symmetrical is chosen for the first bar in cross section with a correspondingly adapted recess of the holder.

It is expedient for the holder to be arranged on a handle positioned on the second bar and, in particular, to be connected to the handle, and, in particular, for the holder and the handle to be connected in one piece. This results in a constructionally simple design. The number of individual parts required for the support can be minimized. Manufacture and assembly are simplified. Furthermore, one-hand operability of the support can then be easily achieved. It can be held at the handle, and clamping at an object can be brought about by rotating the support (as combination of first bar and second bar). With the holding hand, which holds the support at the handle, the actuating element of the actuating device can also be actuated, in particular, without having to be grasped, in order to displace the first bar in the first direction of displacement.

It is expedient for a handle which can be gripped with a single hand and by means of which the combination of first bar and second bar can be rotated to be arranged on the second bar. This results in simple operability. In particular, the handle is constructed so as to be ergonomically favorable and, for example, prevent or hinder a slipping-off of the operator's hand.

The handle is expediently constructed as sleeve which is seated on the second bar and, in particular, surrounds the second bar. This results in simple manufacturability.

It is particularly advantageous for the actuating element to be arranged in relation to the handle such that when holding the support at the handle with a holding hand, the actuating element can be actuated with one or more fingers of this holding hand. In particular, the corresponding dimensions are in line with an "average hand". An operator can then hold the support at the handle with the holding hand and by actuating the actuating element bring it into a pretension position in which the abutment elements lie against the object. When this position is then reached so that rotation of the first bar and the second bar relative to the abutment elements is possible, he can then rotate the combination of first bar and second bar while gripping the handle and set the final supporting position. These operations can all be performed with a single hand. The operator's other hand is then free for other activities. A high degree of operating convenience is achieved.

It is ergonomically favorable for the actuating element to comprise a finger placement hollow in which, for example, an area around the thumb saddle joint or the tip of an index finger can be placed depending on how the operator holds the handle. This results in a high degree of operating convenience for one-hand operation.

In one embodiment, the actuating device comprises at least one push element which acts on the first bar, and the lever element acts on the at least one push element. A pump mechanism for initiating displacement of the first bar in the first direction of displacement can be easily implemented by the at least one push element. A lever transmission can be provided by the lever element, which results in a high degree of operating convenience.

It is expedient for the at least one push element to have an initial position or an initial position range in relation to the first bar in which the first bar is displaceable in relation to the at least one push element and the second bar. For example, when the blocking device is released, the first bar can then be guided on the second bar in the second direction of displacement when the push element is in this initial position or in this initial position range. It is, for example, thus possible to release a supporting position in a simple way. In principle, it is also possible, if the at least one push element is in the initial position or in the initial position range, and the blocking device is released, to "manually" pull out the first bar with the other operator hand, which is not holding the support.

It is also expedient for the at least one push element to have an advanced position or an advanced position range in which the at least one push element is fixed to the first bar, it being possible for the at least one push element to be brought from the initial position or the initial position range into the advanced position or the advanced position range by a pivotal movement of the lever element in a first pivotal direction. The lever element can be acted upon accordingly by the actuating element. When the at least one push element has reached the advanced position or the advanced position range, then by way of a corresponding lever transmission the at least one push element can be displaced in relation to the second bar and, as a result, the first bar can also be displaced in the first direction of displacement in relation to the second bar.

It is also expedient for the actuating device to be constructed such that starting from the advanced position or the advanced position range of the at least one push element, a further pivoting of the lever element in the first pivotal direction moves the at least one push element and, owing to the fixing, the first bar relative to the second bar in an translatory manner in the first direction of displacement. A displacement movement in the first direction of displacement is thereby initiated by a mechanism of mechanically relatively simple construction. This mechanism can be implemented in a compact way.

It is also expedient for the at least one push element to be spring-loaded, with a corresponding spring device being arranged and constructed such that it endeavors to bring the at least one push element from the advanced position or the advanced position range into the initial position or the initial position range. If the lever element does not exert any corresponding force, then the initial position or the initial position range can thereby be automatically reached again. A pumping operation for displacement of the first bar in the first direction of displacement can thus be performed in a simple way. By a pivotal movement of the actuating element in the first pivotal direction, a clamping of the at least one push element to the first bar is achieved and an advancing over a certain distance in the first direction of displacement is attained. When the actuating element is let go of, the at least one push element then returns to its initial position, and the adjusted displacement position is maintained. By a further pivoting of the actuating element in the first pivotal direction a further advancing is attained, etc. The first bar can thereby be displaced stepwise (by the "pumping actuation") in the first direction of displacement, with each displacement position, when it is reached, being secured.

It is then also expedient for the lever element and/or the actuating element to be spring-loaded, with a corresponding spring device being arranged and constructed such that it endeavors to move the lever element and/or the actuating element in a second pivotal direction opposite to the first pivotal direction. A pump mechanism can thereby be implemented in a simple way. The operator actively moves the actuating element in the first pivotal direction, thereby overcoming the spring force of the aforementioned spring device. By letting go of the actuating element, it returns to its initial position, and a further pivotal movement in the first pivotal direction can then be performed.

In particular, when pivoting the lever element in the first pivotal direction, the actuating element is moved towards the second bar, and, in particular, the lever element is formed on the actuating element. An actuating device with a pump mechanism which is of compact construction and constructionally advantageous design can thereby be constructed in a simple way.

In one embodiment, the at least one push element is of plate-shaped construction with a center plane, and in the advanced position or the advanced position range the center plane is orientated at a first acute angle to a perpendicular plane to the first direction of displacement, and in the initial position or the initial position range is orientated at least approximately parallel or at a second acute angle, which is smaller than the first acute angle, to this perpendicular plane. The push element is, for example, formed as sheet-metal element. This results in a compact implementation with a simple constructional design.

It is provided that the at least one push element has a through-opening through which the first bar passes. The angular orientation of the at least one push element to the first bar can thereby be changed in a simple way in order, in particular, to achieve a clamping.

It is particularly advantageous for the blocking device to be releasable and, in particular, manually releasable, and, without release, a displacement of the first bar relative to the second bar in the second direction of displacement is blocked, and, with release, a displacement of the first bar in the second direction of displacement is unblocked. It is thereby ensured that the first bar does not "snap back" in the second direction of displacement when displaced in the first direction of displacement. Owing to the releasability and, in particular, manual releasability, however, the first bar can be moved in the second direction of displacement as required.

It is expedient for the blocking device to comprise at least one blocking element which is clampable or latchable to the first bar. A blocked position can be achieved by the clamping or latching to the first bar. The displacement movement of the first bar relative to the second bar in the second direction of displacement can be blocked by the blocked position. Owing to a clamping or latching to the first bar, the blocked position can, however, also be released by a movement of the first bar in the first direction of displacement. For example, the blocking element can also be provided for latching to the first bar. For example, the blocking element is formed by a nose which is insertable in a corresponding recess in the first bar.

It is particularly advantageous for the at least one blocking element to be arranged for pivotal movement relative to the first bar, and, in dependence upon a pivotal position, the at least one blocking element is in a clamped position or latched position on the first bar or the first bar is released. Releasability at the blocking device is achievable by a corresponding pivotal movement being performed manually from the outside so as to enable release. The first bar can thereby be freely displaced relative to the second bar (in the first direction of displacement and in the second direction of displacement). However, it is thereby also possible to release a blocked position by means of a movement of the first bar. When, in a certain pivotal position, the at least one blocking element is clamped or latched to the first bar and the pivotal position is changed by a displacement of the first bar (in the first direction of displacement), a displacement of the first bar in the first direction of displacement and also relative to the at least one blocking element is then thereby possible. An automatic release of the blocked position for a displacement in the first direction of displacement is thereby achievable. An automatic adaptation at the actuating device is thereby implemented. Actuation at the actuating element for a displacement in the first direction of displacement then results in the blocking by the blocking device being automatically released, precisely to enable the displacement in the first direction of displacement. The displacement in the second direction of displacement is, however, blocked when an advancing procedure at the actuating device in the first direction of displacement is terminated. A blocked position remains releasable from the outside by an active manual pivoting.

In particular, upon a displacement movement of the first bar in the first direction of displacement by means of the actuating element, the at least one blocking element is brought out of a clamped position or latched position into a released position by the displacement of the first bar. A corresponding actuation of the actuating element (which, in particular, results in a clamping and displacement of a push element on the first bar) then automatically results by way of the displacement of the first bar in a release of a blocked position at the blocking device, which, in turn, then enables an advancing in the first direction of displacement.

It is then expedient if in a clamped position or in a clamped position range, the at least one blocking element lies in relation to a center plane at an acute angle to a perpendicular plane to the first direction of displacement, this acute angle having an opposite sign in comparison with an acute angle of a push element for initiating a movement in the first direction of displacement when this push element is in a clamped position on the first bar. By exerting force on the first bar by way of the push element, the clamped position of the blocking element at the at least one blocking element can thereby be used to release a blocking by the at least one blocking element. This "release" is only effective in one direction, namely for a displacement of the first bar in the first direction of displacement.

For example, the at least one blocking element is of plate-shaped construction and, in particular, constructed as sheet-metal element.

It is also expedient for the at least one blocking element to have a through-opening through which the first bar passes. A clamping on the first bar can thereby be achieved in a simple way.

It is particularly advantageous for a blocking element stack consisting of a plurality of blocking elements to be provided. The blocking elements in the blocking element stack can be connected to one another or stacked loosely on one another. A clamping of several blocking elements to the first bar is thereby achievable. A higher force bearing capacity is thereby achieved. It is, in principle, possible that in a clamped position the corresponding force must be absorbed by way of the at least one blocking element, with the at least one blocking element being held with force locking on the first bar. The holding force can be increased by the enlargement of the contact surface owing to a plurality of blocking elements.

It may be provided that the at least one blocking element is spring-loaded, with a corresponding spring device being arranged and constructed such that it endeavors to bring the at least one blocking element into the blocked position. If no corresponding intervention occurs, the blocked position is thereby automatically established. If, for example, the at least one blocking element is arranged for pivotal movement, the spring device then presses the at least one blocking element into the blocked position. The blocked position can be released by a countermovement against the spring force of this spring device. The release can be carried out manually from the outside. Owing to a coupling in the actuating device, upon actuation of an advancing of the first bar in the first direction of displacement and by entrainment of the at least one blocking element, in particular, in a pivotal movement, the blocked position can also be released.

It is expedient for a release grip which acts on the at least one blocking element to be provided, the release grip being, in particular, arranged on the at least one blocking element, and the release grip being, in particular, constructed as release switch. The at least one blocking element can be acted on manually by the release grip, in particular, in order to release a blocked position. For example, the release grip is constructed such that the at least one blocking element is pivotable relative to the first bar.

It is particularly advantageous for the release grip to be positioned such that it is actuatable with one-hand operation when the support is held with a corresponding hand. For example, the support is held at a handle with one hand. The actuating element is, for example, actuatable with the thumb or index finger of this holding hand. The release grip is then actuatable with another finger, for example, the index finger or thumb. One-hand operation is then achievable both for clamping a support at an object and for releasing the support from the object.

In particular, the release grip is arranged on a side that faces away from a side on which the actuating element is arranged. The first bar lies between the side on which the actuating element is arranged and the side on which the release grip is arranged. One-hand operation is thereby possible in an easy way.

It is, in principle, possible for the release grip to be arranged between a push element of the actuating device and the second abutment element. In this embodiment, the release grip lies, as it were, below the push element. When holding the support, a finger such as the index finger can, for example, thereby act directly on the release grip.

In an alternative embodiment, the release grip is arranged between a push element of the actuating device and the first abutment element. It is thus arranged above the push element. This embodiment may be advantageous if unintentional release is to be prevented as with such an arrangement, as a rule, a change in the position of the hand or the position of the fingers is necessary in order to be able to act on the release grip.

Expediently, the second bar has a plunge-in area for the first bar. A compact support with a large span can thereby be implemented. In particular, the first bar is guided in the plunge-in area. It is, for example, guided by a sliding guide; an inner side of the second bar at the plunge-in area then preferably forms a slide bearing for an outer side of that area of the first bar which is positioned in the plunge-in area. The risk of buckling is counteracted by the guiding of the first bar in the plunge-in area of the second bar.

It is particularly advantageous for a damper and, in particular, an elastic stop device for the first bar to be arranged in the plunge-in area at an end facing the second abutment element. The elastic stop device is formed, for example, by one or more buffers such as rubber buffers or, for example, a hydraulic or pneumatic damper is provided or a frictional damper may be provided. When, for example, the blocking device is released, the first bar can then fall onto an inner stop surface of the second bar in the plunge-in area and thereby strike it hard. The impact is damped by the elastic stop device. This results in an increase in operating convenience.

In one embodiment, the first bar is provided with recesses, and the actuating device comprises at least one engagement element which is insertable into a recess. A displacement position of the first bar relative to the second bar in relation to the first direction of displacement and the second direction of displacement can be secured with positive locking by the insertion of the engagement element into an associated recess. A high force bearing capacity of the corresponding support is thereby achieved.

It is then expedient for the at least one engagement element to be arranged on a holder for the actuating element. This results in a compact construction. One-hand operability can also be implemented.

For example, the actuating device comprises a switch which acts on the at least one engagement element and by means of which the at least one engagement element is insertable into and withdrawable from a recess. This results in simple operability.

It is then expedient for the switch to be arranged so as to be operable with that hand which holds the support and, in particular, with which the actuating element is operable when holding the support. This results in complete one-hand operability of the support.

It is particularly advantageous for the first bar to be arranged in a rotationally fixed manner on the second bar. The combination of first bar and second bar can thereby be rotated and, in doing so, rotated relative to the first abutment element and the second abutment element, in order to set a final position or supporting force of the support.

BRIEF DESCRIPTION OF THE DRAWINGS

The following description of preferred embodiments will serve in conjunction with the drawings to explain the invention in greater detail. There are shown in:

FIG. 1 a side view of an embodiment of a support in accordance with the invention;

FIG. 2 a sectional view of the support in accordance with FIG. 1 along line 2-2 in accordance with FIG. 3;

FIG. 3 another side view of the support in accordance with FIG. 1;

FIG. 4 a sectional view along line 4-4 in accordance with FIG. 1;

FIG. 8 a sectional view similar to FIG. 5 for a further embodiment of a support;

FIG. 9 a side view of a further embodiment of a support in accordance with the invention;

DETAILED DESCRIPTION

Figure 5:
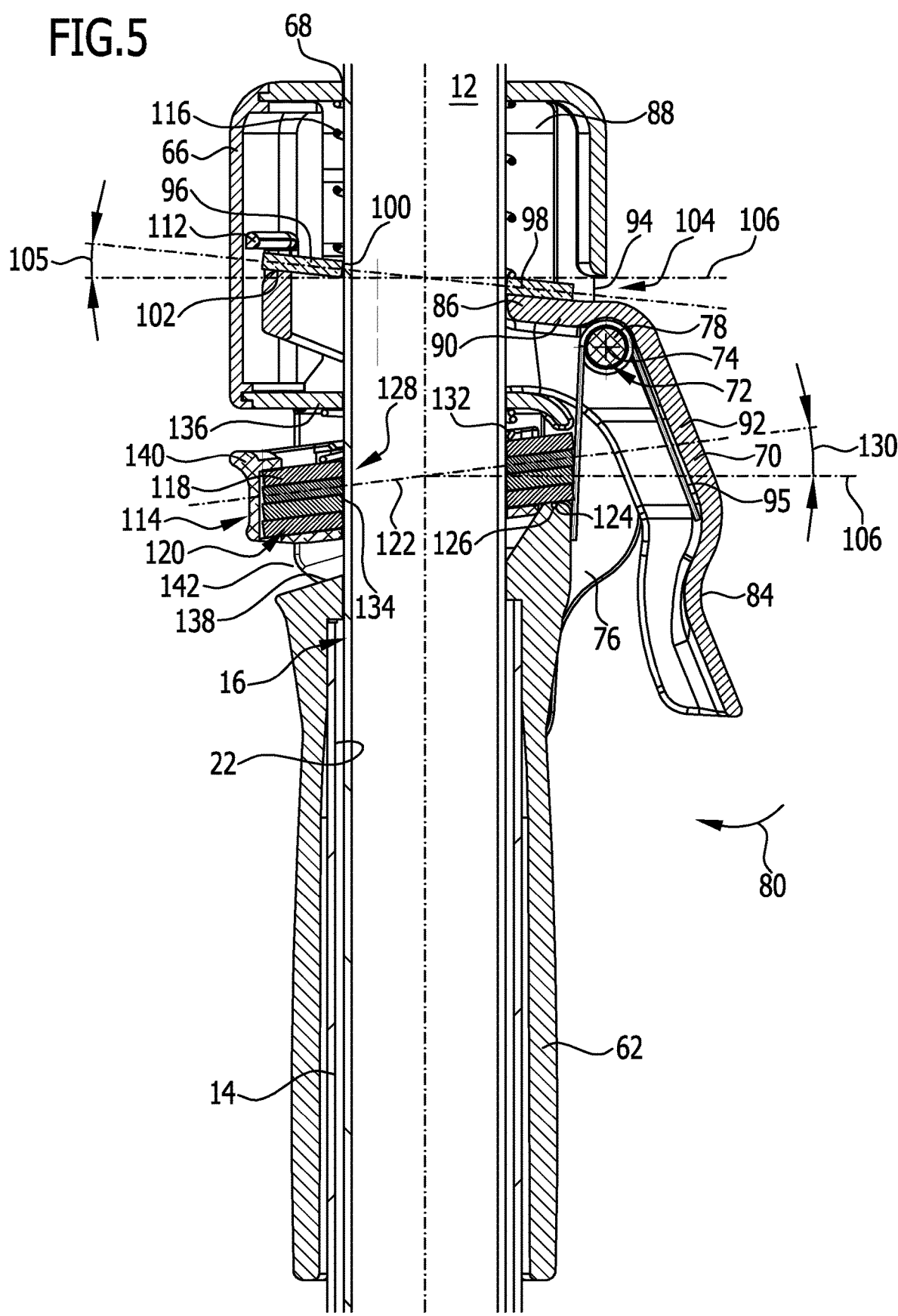
FIG. 5 an enlarged illustration of area B in accordance with FIG. 2 in an initial position of a push element.

A first embodiment of a support in accordance with the invention, which is shown in FIGS. 1 to 7 and is denoted by 10, comprises a first bar 12 and a second bar 14. The first bar 12 is displaceably guided by way of a guiding device 16 on the second bar 14.

The first bar 12 is displaceable by way of the guiding device 16 in relation to the second bar 14 in a first direction of displacement 18 and in a second direction of displacement 20. The second direction of displacement 20 is the direction opposite to the first direction of displacement 18.

In one embodiment, the second bar 14 has a plunge-in area 22 into which the first bar 12 plunges.

The second bar 14 is constructed, in particular, as a hollow tube, and the plunge-in area 22 of the second bar 14 is formed by a corresponding interior of this hollow tube.

The first bar 12 has a longitudinal extent in the first direction of displacement 18. The second bar 14 has a longitudinal extent in the second direction of displacement 20. A diameter of the first bar 12 is considerably smaller than a length of the first bar 12 in the first direction of displacement 18. A diameter of the second bar 14 is considerably smaller than a length of the second bar 14 in the first direction of displacement 18. In particular, the first bar 12 has a length in the first direction of displacement 18, which is at least 30 cm and, in particular, at least 50 cm. Furthermore, the second bar 14 has a length in the first direction of displacement 18, which is at least 30 cm and, in particular, at least 50 cm.

A first abutment element 26 is arranged on the first bar 12 in the area of an end 24 of the first bar 12. The end 24 of the first bar 12 faces away from the second bar 14.

The first abutment element 26 is constructed, for example, as plate 28, which, in one embodiment, is provided with a profile 30, for example, with a ribbed profile, which has spaced grooves with ribs lying between them.

In particular, the plate 28 is produced from a plastic material.

The first abutment element 26 is held by way of a first thread 32 with a first thread direction on the first bar 12 in the area of its end 24.

In one embodiment, a lug device 34 is fixed to the plate 28. The first abutment element 26 is then held on a pin 36 by way of the lug device 34. In particular, a pivot bearing 38 is formed by way of the lug device 34, which comprises, for example, spaced lugs between which the pin 36 is seated, and the pin 36. A corresponding pivot axis 40 lies transversely and, in particular, perpendicularly to the first direction of displacement 18. In FIG. 1, the pivot axis 40 is orientated perpendicularly to the drawing plane.

The pivot bearing 38 is, in particular, "sluggish" in the sense that a force is required to change a set pivotal position of the first abutment element 26 relative to the first bar 12. The "sluggishness" at the pivot bearing 38 is produced, for example, by one or more discs and, in particular, plastic discs, which enable a set pivotal position to be held with force locking, being seated between the pin 36 and lugs of the lug device 34.

The pin 36 is constructed, in particular, as threaded pin, which has an external thread. The pin 36 is then rotationally fixedly connected to the first abutment element 26 in relation to an axis of rotation parallel to the first direction of displacement 18.

The first thread 32, which is positioned on the first bar 12, is then an internal thread in which the external thread of the pin 36 engages.

In one embodiment, an insert 42, which is fixed to the first bar 12, is seated at the end 24 of the first bar 12. The insert 42 is, for example, connected by press fit to the first bar 12 or is secured to the first bar 12.

Formed on the insert 42 is the first thread 32, which is then correspondingly fixed to the first bar 12 by way of the insert 42.

A second abutment element 46 is seated at an end 44 of the second bar 14. The second abutment element 46 is fixed to the second bar 14 by way of a second thread 48. The end 44 at which the second abutment element 46 is seated faces away from the end 24 of the first bar 12 at which the first abutment element 26 is seated.

The second thread 48 by way of which the second abutment element 46 is seated on the second bar 14 has a second thread direction. The second thread direction is opposite to the first thread direction of the first thread 32.

If the first thread 32 is a left-hand thread, then the second thread 48 is a right-hand thread. If the first thread 32 is a right-hand thread, then the second thread 48 is a left-hand thread.

In one embodiment, an insert 52 which, for example, is secured to the second bar 14 is positioned at the end 44 of the second bar 14. This insert 52 forms the second thread 48.

The second abutment element 46 is basically of the same construction as the first abutment element 26 with a plate 54, a lug device 56 and a pin 58.

The plate 54 is held on the pin 58 by way of a pivot bearing 60, and a corresponding shaft is fixed to the lug device 56.

A corresponding pivot axis of the pivot bearing 60 is parallel to the pivot axis 40.

The pin 58 is preferably constructed as threaded pin with an external thread which engages the second thread 48, which is then correspondingly formed as internal thread.

The plate 54 may be identical in construction to the plate 28. It may also have different dimensions and, depending on the use, may, for example, have smaller or larger lateral dimensions.

Owing to the positioning of the first abutment element 26 on the first bar 12 by way of the first thread 32, the relative position of the pivot axis 40 in a plane perpendicular to the first direction of displacement 18 depends on the respective rotational position of the first abutment element 26 in relation to the first bar 12.

In a corresponding manner, the position of the pivot axis of the pivot bearing 60 in a plane perpendicular to the first direction of displacement 18 depends on the rotational position of the second abutment element 46 in relation to the second bar 14.

The distance between the first abutment element 26 and the second abutment element 46 can be increased by displacement in the first direction of displacement 18. The first direction of displacement 18 is thus a direction of increase in distance for the abutment elements 26, 46.

The distance between the first abutment element 26 and the second abutment element 46 can be reduced by displacement of the first bar 12 relative to the second bar 14 at the guiding device 16 in the second direction of displacement 20.

If a displacement position between the first bar 12 and the second bar 14 is fixed (as will be explained in greater detail hereinbelow), then owing to the opposite thread directions on the first thread 32 and the second thread 48, by rotation of the combination of the first bar 12 and the second bar 14 a supporting force can be exerted by way of the abutment elements 26, 46, by means of which the support 10 is clampable on an object. The support then lies by way of the first abutment element 26 against a first wall of the object and by way of the second abutment element 46 against a second wall of the object, with the first wall located opposite the second wall and the support 10 positioned in its entirety between the first wall and the second wall.

The first abutment element 26 is held rotatably on the first bar 12 by way of the first thread 32. The second abutment element 46 is held rotatably on the second bar 14 by way of the second thread 48.

The guiding device 16 is constructed such that at least when the first bar 12 is fixed with respect to the second bar 14 for the displacement in the directions of displacement 18, 20, the first bar 12 is rotationally fixed with respect to the second bar 14. Consequently, the combination of first bar 12 and second bar 14 can be rotated in its entirety.

This rotational fixing can be provided, for example, by a corresponding cross-sectional profile of the first bar 12 in relation to the guiding device 16.

A handle 62 is arranged on the second bar 14. This handle 62 is fixedly positioned (rotationally fixed, undisplaceable) on the second bar 14 and, in particular, on an outer side of the second bar 14. It is constructed as sleeve 64 which surrounds the second bar 14 (completely).

The handle 62 serves, when the displacement position of the first bar 12 relative to the second bar 14 is fixed, to carry out a rotational movement of the entire combination, in order to bring about a clamping of the support 10 between the first wall and the second wall of the object, as explained above.

The handle 62 is constructed such that it can be gripped by grasping with a single hand. In particular, it is constructed so as to counteract a slipping-off of the holding hand. In particular, an outer side of the handle 62 is of non-rotationally symmetrical construction so as to enable good rotatability of the second bar 14 (and thereby also of the first bar 12). It has, for example, depressions and elevations which, for example, are orientated parallel or at an acute angle to the first direction of displacement 18.

The handle 62 is produced, in particular, from a plastic material.

A holder 66 is positioned on the second bar 14. This is, in particular, of sleeve-shaped construction.

In particular, the holder 66 is positioned on the handle 62 and connected to it. It is, in particular, connected in one piece to the handle 62.

For example, the combination of the handle 62 and the holder 66 is constructed as a part which is produced in an injection molding process.

The holder 66 has a through-opening 68 which is connected to the plunge-in area 22 of the second bar 14. The first bar 12 passes through the through-opening 68 and plunges into the plunge-in area 22 of the second bar 14.

In one embodiment, the holder 66 forms together with the plunge-in area 22 the guiding device 16. The through-opening 68 is adapted accordingly to an (external) profile of the first bar 12 so as to enable translatory guidance. In particular, the translatory guidance is rotationally fixed with respect to an axis of rotation parallel to the first direction of displacement 18.

It is, for example, provided that the through-opening 68 is constructed on the holder 66 such that the first bar 12 is guided and in the plunge-in area 22 is guided outside of the holder 66 (in a sliding guide). With guidance in the plunge-in area 22 as well the risk of the first bar 12 buckling is counteracted.

The holder 66 with its through-opening 68 and the plunge-in area 22 then form for the first bar 12 a slide bearing for displacement guidance in the first direction of displacement 18 and in the second direction of displacement 20.

The holder 66 is constructed, in particular, as sleeve.

The handle 62 has an end which faces the second abutment element 46 and an end which faces the first abutment element 26. The holder 66 is arranged at the end of the handle 62 that is associated with the first abutment element 26. It is thus arranged in relation to the second abutment element 46 above the handle 62. This enables, as will be explained in greater detail hereinbelow, one-hand actuation of an actuating element 70 arranged on the holder 66.

The actuating element 70 is mounted for pivotal movement by way of a pivot bearing 72 on the holder 66. A pivot axis 74 is orientated transversely and, in particular, perpendicularly to the first direction of displacement 18.

The pivot bearing 72 is arranged on an outer side of the holder 66. For this purpose, spaced ribs 76 are, for example, positioned on the holder 66. The ribs 76 (only one is shown in FIG. 1) are, in particular, connected in one piece to the holder 66.

The ribs 76 have corresponding openings in which a shaft 78 is seated, and is, for example, rotationally fixedly seated on the ribs 76. The actuating element 70 is rotatably mounted on the shaft 78. In this sense, the shaft 78 is then an outer shaft.

It is, for example, also possible for the corresponding shaft to be rotationally fixedly connected to the actuating element 70 and the shaft rotatably mounted on the ribs 76.

The actuating element 70 is constructed as handle. It has a first pivotal direction 80 (FIG. 5) which corresponds to movement of the actuating element 70 towards the holder 66 and, therefore, towards the second bar 14. It has a second pivotal direction 82 (FIG. 6) which is a direction opposite to the first pivotal direction 80 and corresponds to a pivoting away from the holder 66 (and, therefore, the second bar 14).

The actuating element 70 is arranged and constructed such that an operator gripping the support 10 at the handle 62 can actuate the actuating element 70 in its pivotal movement, in particular, in the first pivotal direction 80 with the same hand and, in particular, can actuate it with the index finger or the thumb, depending on how the operator is holding the handle.

The actuating element 70 has, in particular, a finger placement hollow 84 in which, during use in accordance with the specifications and when gripping the handle 62 with one hand, an area of the thumb saddle joint or of the tip of the index finger of the same hand can be placed. (This is based on an average hand size.)

The actuating element 70 acts on a lever element 86 which is arranged on the holder 66 and, in particular, is arranged in an interior 88 of the holder 66. The holder 66 then forms a housing for the lever element 86.

In the embodiment shown, the lever element 86 is formed on the actuating element 70. For this purpose, the actuating element 70 has a transverse element 90 which is connected, and, in particular, is connected in one piece, to a longitudinal element 92 on which the finger placement hollow 84 is formed.

In particular, the shaft 78 is positioned at an area of transition from the longitudinal element 92 to the transverse element 90.

The holder 66 has an opening 94 and so the longitudinal element 92 is positionable outside of the holder 66, and the transverse element 90 is positioned in the interior 88 of the holder 66, the transverse element 90 being connected to the longitudinal element 92.

Owing to the connection of the longitudinal element 92 to the transverse element, a pivotal movement of the actuating element 70 brings about a corresponding pivotal movement of the lever element 86.

The actuating element 70 in one embodiment is supported by way of a (first) spring device 95 on the holder 66. This first spring device 95 is arranged and constructed such that a spring force of the first spring device 95 endeavors to pivot the actuating element 70 about the pivot axis 74 in the second pivotal direction 82 as far as a corresponding stop. To enable pivoting of the actuating element 70 in the first pivotal direction 80, the spring force of the first spring device 95 must be overcome.

The first spring device 95 is formed, for example, by a corresponding elastic element, which is supported on the holder 66 and, for example, on an outer side of the holder 66 and on an inner side of the longitudinal element 92 facing it.

Arranged in the interior 88 of the holder 66 is (at least) one push element 96. This push element 96 is of plate-shaped construction. (It is constructed as "lamina".) It has a center plane 98.

The push element 96 is, for example, a sheet-metal element.

The push element 96 has a through-opening 100. The first bar 12 passes through this. The lever element 86 acts on the push element 96. It is positionable against a side 102 of the push element 96, which faces the second abutment element 46.

The push element 96 has an initial position (or an initial position range with several initial positions) which is shown in FIG. 5. In this initial position 104 (starting position) the push element 96 is positioned such that the first bar 12 is freely displaceable through the opening 94, i.e., the push element 96 does not hinder the displaceability of the first bar 12. However, an additional blocking device 114 can block this movability.

The initial position 104 is, in particular, a position in which the center plane 98 of the push element 96 is orientated at a second acute angle 105 to a perpendicular plane 106 to the first direction of displacement 18. In the embodiment shown in FIG. 5, the second acute angle is approximately 5°.

Figure 6:
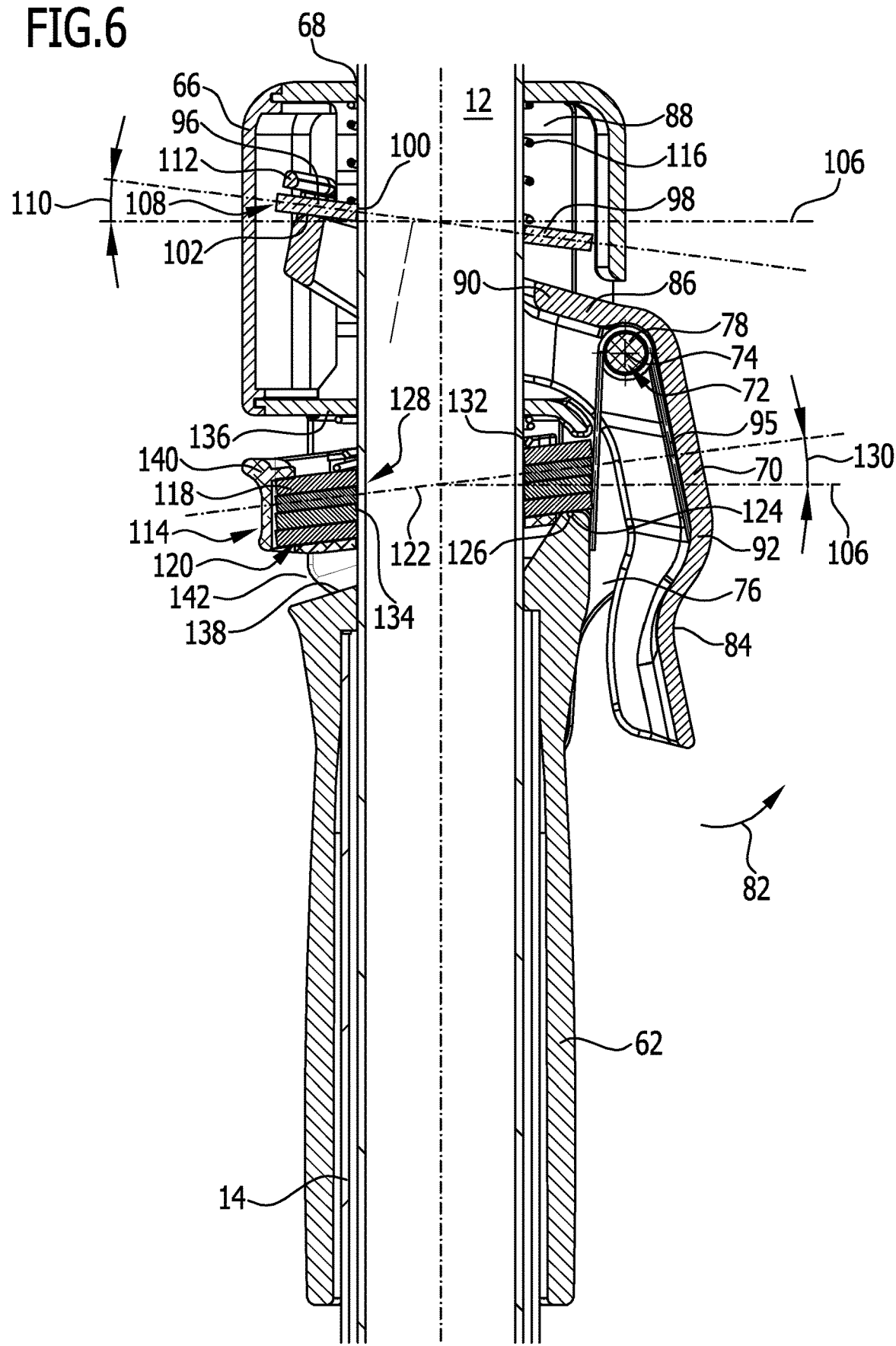
FIG. 6 an enlarged illustration of area B in accordance with FIG. 2 in an advanced position of the push element.

Furthermore, the push element 96 has an advanced position (or an advanced position range with several advanced positions) 108. A corresponding advanced position is shown in FIG. 6. In the advanced position 108, the push element 96 is orientated in relation to its center plane 98 at a first acute angle 110 to the perpendicular plane 106. The push element 96 is fixed to the first bar 12, in particular, by clamping. Owing to the first acute angle 110, clamping of the first bar 12 in the opening 94 is brought about with the push element 96.

The first acute angle 110 is larger than the second acute angle 105.

In the embodiment shown in FIG. 6, the first acute angle 110 is approximately 10°.

In one embodiment, a guiding element 112, which is movable with the push element 96, is arranged on the push element 96 opposite the side 102. The guiding element 112 serves to guide the push element 96 in the holder 66.

The push element 96 can be brought from its initial position 104 into the advanced position 108 by way of the lever element 86 and, therefore, by way of the actuating element 70. By pivoting the actuating element 70 in the first pivotal direction 80 (thereby overcoming the spring force of the first spring device 95), the lever element 86 exerts a force on the push element 96 at the side 102, which brings about the transition to the advanced position 108 (FIG. 6). The dimensions are such that further pivoting in the first pivotal direction 80 brings about a translatory movement of the push element 96 in the first direction of displacement 18. The first bar 12, which is clamped to the push element 96, is thereby displaced in relation to the second bar 14 in the first direction of displacement 18. The displacement distance in the first direction of displacement 18 is predefined by the corresponding construction of the lever element 86 and the arrangement of the push element 96.

When the actuating element 70 is released, the actuating element 70 pivots back in the second pivotal direction 82 and the exertion of force by the lever element 86 on the push element 96 is terminated. Owing to a blocking device 114 which is separate and, in particular, spaced from the push element 96, the first bar 12 remains in the displacement position it had previously reached.

The push element 96 can fall back into its initial position 104 by way of its opening 94.

This falling back can be assisted by a second spring device 116, which is arranged in the interior 88 of the holder 66 and acts on the push element 96. The second spring device 116 is arranged and constructed such that it endeavors to bring the push element 96 into its initial position 104.

The second spring device 116 comprises, for example, a spiral spring, which surrounds the first bar 12 and is arranged in the interior 88 of the holder 66.

When the actuating element 70 is pivoted by the spring force of the first spring device 95 in the second pivotal direction 82 into its starting position and the exertion of force by the lever element 86 on the push element 96 is reduced and possibly eliminated entirely, then the second spring device 116 can press the push element 96 out of the advanced position 108 into the initial position 104.

The blocking device 114 comprises a plurality of blocking elements 118. The blocking elements 118 are, in particular, fixedly connected to one another or loosely stacked in a blocking element stack 120. A blocking element 118 may be identical in construction to a push element 96.

A blocking element 118 is, in particular, a sheet-metal part, which is plate-shaped with a corresponding center plane 122.

When the support 10 is clamped at an object between the first wall and the second wall, the blocking element stack 120 must carry a corresponding load. It is, therefore, advantageous for a plurality of blocking elements 118 to be provided in the blocking element stack 120. (The push element 96 has no effect for the load bearing during the clamping; it is only required for initiating the displacement movement of the first bar 12 in relation to the second bar 14 in the first direction of displacement 18.)

An abutment 124 for the blocking element stack 120 is formed on the holder 66. This abutment 124 provides a supporting point for the blocking element stack 120. A pivot axis 126 is arranged at the abutment 124. The pivot axis 126 is formed by an abutment area of the blocking element stack 120 at the abutment 124.

The abutment 124 is arranged in relation to the first bar 12 on a side opposite the guiding element 112.

In a blocked position 128, the blocking element stack 120 blocks the displacement in the second direction of displacement 20.

The blocked position 128 is ensured by the corresponding center planes 122 of the blocking elements 118 lying at an acute angle 130 to the perpendicular plane 106. The acute angle 130 has an opposite sign to the first acute angle 110 and the second acute angle 105. In the clamped position (advanced position 108) of the push element 96, it, therefore, has in relation to the perpendicular plane 106 an opposite orientation to a blocking element 118 in its blocked position 128.

The blocking element stack 120 is acted upon by a (third) spring device 132. This third spring device 132 endeavors to press the blocking element stack 120 into the blocked position 128 so that it is orientated with the respective acute angle 130 to the perpendicular plane 106.

The blocking elements 118 have respective through-openings 134 through which the first bar 12 passes. In the blocked position 128, a blocking element 118 is clamped to the first bar 12 by way of the through-opening 134. The blocked position 128 is, consequently, a clamped position of the blocking elements 118 of the blocking element stack 120.

The third spring device 132 which, for example, comprises a spiral spring and is supported at a wall 136 of the holder 66, which is orientated transversely to the first direction of displacement 18 and constitutes a delimitation in relation to an area in the interior 88 in which the transverse element 90 (the lever element 86) is arranged, endeavors to press the blocking element stack 120 into its blocked position 128 and, therefore, to orientate it at the acute angle 130 to the perpendicular plane 106.

Arranged on the holder 66 is a stop 138 which is located opposite the abutment 124 and which delimits the range of movement of the blocking element stack 120 accordingly.

Without the influence of an operator, the blocking element stack 120 of the blocking device 114 prevents the first bar 12 from being able to move in the second direction of displacement 20 relative to the second bar 14.

The blocked position 128 causes the blocking element stack 120 to be clamped to the first bar 12 and the displacement of the first bar 12 in the second direction of displacement 20 to thereby be blocked.

When the actuating element 70 is pivoted in the first pivotal direction 80 and the push element 96 is thereby brought into the advanced position 108 and displaced in the first direction of the displacement 18, then owing to the exertion of force on the first bar 12, the blocking element stack 120 is pivoted, more specifically, such that the acute angle 130 is reduced in size. The clamped position (the blocked position 128) is thereby released and the first bar 12 can be displaced upwards relative to the second bar 14, i.e., the first bar 12 can be displaced in the corresponding openings of the blocking elements 118. Movement of the first bar 12 in the second direction of displacement 20 is blocked by the movement in the first direction of displacement 18. When under the effect of the first spring device 95 the actuating element 70 is pivoted in the second pivotal direction 82, the blocking elements 118 return to their blocked position 128 and displacement of the first bar 12 in the second direction of displacement 20 is blocked.

The blocking device 114 is constructed as releasable blocking device. A release grip 140 is arranged on the blocking element stack 120. This release grip 140 is arranged on a side which is located in relation to the first bar 12 opposite the longitudinal element 92 of the actuating element 70; the first bar 12 lies between the release grip 140 and the actuating element 70 and thus, in particular, the longitudinal element 92 of the actuating element 70.

As mentioned above, the blocking element stack 120 is arranged by way of the abutment 124 with the pivot axis 126 pivotably on the holder 66. By means of the release grip 140, the blocking element stack 120 can be accessed from the outside and by a corresponding pivoting, with reduction in size of the acute angle 130, the blocked position 128 (the clamped position) of the blocking elements 118 on the first bar 12 released.

By releasing the blocked position 128, the first bar 12 can then be displaced relative to the second bar 14 in the second direction of displacement 20 (and in the first direction of displacement 18.

If the first bar 12 is arranged above the second bar 14 in relation to the direction of gravity, then upon releasing the blocked position, the first bar 12 can fall into the plunge-in area 22 of the second bar 14 under the effect of the force of gravity.

The holder 66 has in the area of the release grip 140 an opening or recess 142 to enable corresponding access.

The release grip 140 is constructed, in particular, as release switch which has two characterized positions, namely, on the one hand, a position in which the blocked position 128 is reached. This position is automatically created by way of the third spring device 132. It also has a released position which is reached by the blocking element stack 120 being pivoted towards the wall 136 by way of the release grip 140.

These characterized positions are defined by, for example, stops.

The release grip 140 is arranged, in particular, so as to be operable by an operator holding the support 10 by the handle 62 and placing his index finger or thumb on the actuating element 70. He can, for example, act with his thumb or index finger on the release grip in order to release the blocked position 128 by a pivotal movement counter to the spring force of the third spring device 132.

In the embodiment shown in FIGS. 1 to 7, the release grip 140 is positioned between the lever element 86 and the second abutment element 46. In this sense, the release grip 140 is positioned below the lever element 86.

Accordingly, the blocking element stack 120 is positioned between the lever element 86 and the second abutment element 46 and in this sense below the lever element 86.

In this embodiment, with the appropriate dimensions and on the basis of an "average hand" it is, for example, possible for the index finger or the thumb to operate the release grip 140 when the hand is holding the handle 62 with this index finger or thumb, and, at the same time, operation of the actuating element 70 is also possible with the thumb or index finger of the same hand.

In an alternative embodiment (FIG. 8) a blocking element stack 144 is arranged above a corresponding actuating element 146 with lever element 148. The blocking element stack 144 and its associated release grip 150 are, consequently, arranged between the first abutment element 26 and the lever element 148.

Otherwise the corresponding support functions as described above with reference to the support 10, and identical reference numerals are used for identical elements.

The described arrangement of the release grip 150 above the lever element 148 and, consequently, at a greater distance from the handle 62 may be advantageous for preventing unintentional release of a blocked position of the blocking element stack 144 when the corresponding support is held at the handle 62. With appropriate dimensions and in relation to standard hand sizes, the release grip 150 is then outside of "normal" reach of, for example, the index finger, i.e., a special movement of the finger and/or the hand is necessary to initiate a releasing procedure.

Otherwise the corresponding support functions as described above, and the blocking element stack 144 has the same function as the blocking element stack 120.

Figure 7:
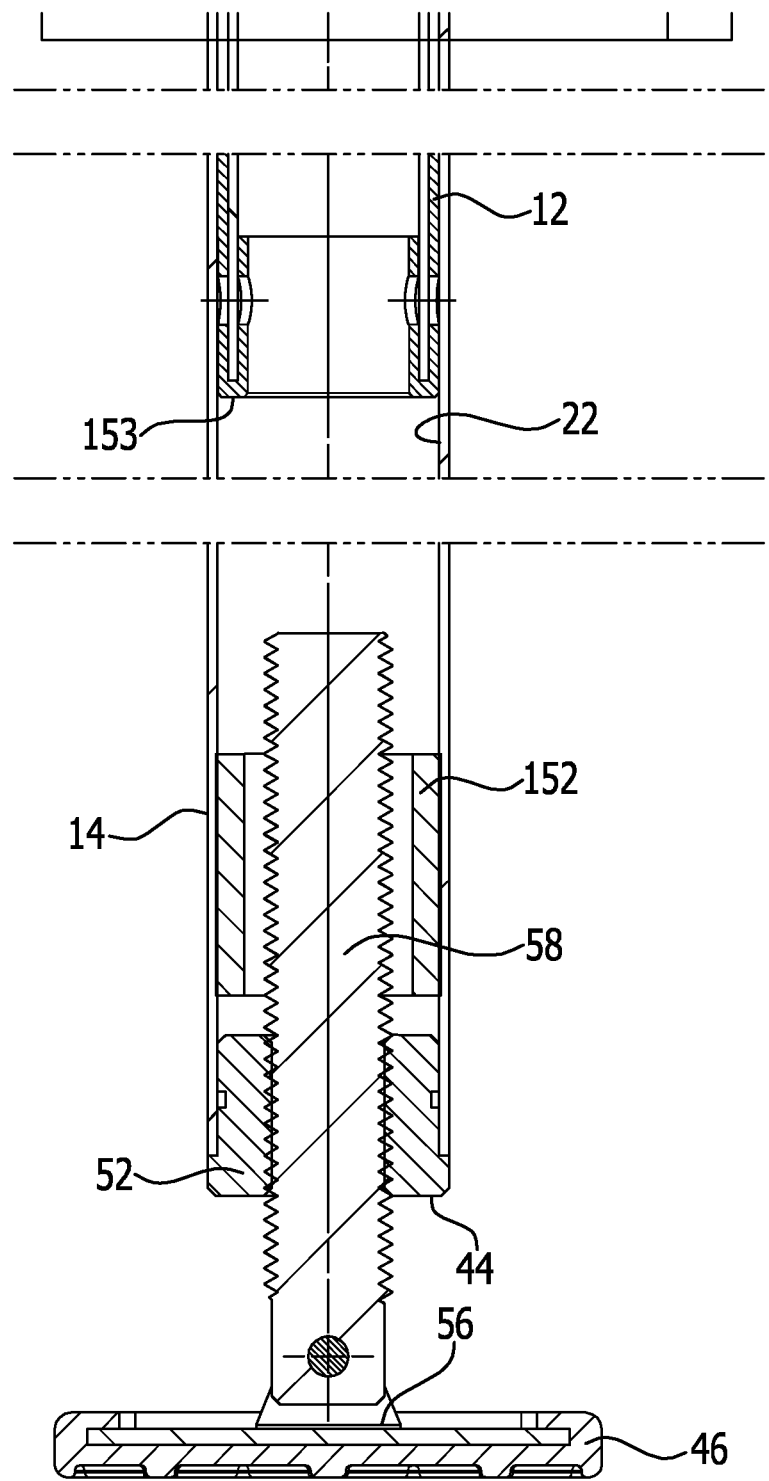
FIG. 7 an enlarged illustration of area C in accordance with FIG. 2.

In one embodiment an elastic stop device 152 is arranged in the plunge-in area 22 in the proximity of the end 44 above the insert 52 (FIG. 7). A wall of the insert 52 provides an abutment surface for the elastic stop device 152. This is arranged and constructed so as to damp an impact of the first bar 12 when it falls into the plunge-in area 22 of the second bar 14.

If, for example, the support 10 is aligned such that the second direction of displacement 20 has a component parallel to the direction of gravity, and if the blocked position 128 of the blocking element stack 120 or the blocking element stack 144 is then released, the first bar 12 then falls owing to the action of gravity into the plunge-in area 22 and then strikes against it. This striking is damped by the elastic stop device 152.

The elastic stop device 152 is formed, for example, by a rubber buffer or the like.

In particular, the elastic stop device 152 is constructed as annular cylinder or the like, which is arranged at a plunge-in area 22. For example, the first stop device 152 is pushed over the corresponding pin 58.

If the first bar 12 is constructed as tube which the pin 58 can partially enter, then the pin 58 can protrude over the elastic stop device 152 (cf. FIG. 7).

In this embodiment, the first bar 12 strikes with an annular surface 153 against a corresponding annular surface of the stop device 152. In particular, the first bar 12 does, therefore, not strike directly against the pin 58.

If the first bar 12 is, for example, formed by a solid material, then the elastic stop device 152 protrudes beyond the pin 58.

In one embodiment of a support 154 (FIG. 9) a first bar 156 is provided, which is basically identical in construction to the first bar 12, with the first bar 156 being formed as tube in which a plurality of spaced recesses 158 are arranged along the first direction of displacement 18. A corresponding recess 158 is, for example, formed as opening into an interior of the corresponding tube.

It is, in principle, also possible for a recess to be formed only as depression, in particular, if the first bar 156 is formed as solid material body.

The same reference numerals for the same elements in the support 10 are used for the support 154.

Arranged on the holder 66 is an engagement element 160 which is insertable into a corresponding recess 158. When the engagement element 160 is inserted in a recess 158, movement of the first bar 156 in relation to the second bar 14 in the second direction of displacement 20 is then blocked by positive locking.

A fixing with positive locking between the first bar 156 and the second bar 14 is thus achievable by the combination of a recess 158 and an engagement element 160 inserted therein. (In the support 10, essentially a fixing with force locking between the first bar 12 and the second bar 14 is brought about by the blocking element stack 120 and 144, respectively, when the blocked position is reached.)

In its simplest configuration, the holder 66 has a recess and the engagement element 160 is a pin which is insertable through this opening into a corresponding recess 158 of the first bar 156 in order to bring about the fixing with positive locking (in relation to the first direction of displacement 18 and the second direction of displacement 20).

It may be provided that a switch 162 is arranged on the holder 66, which acts on the engagement element 60 and with which insertion of an engagement element 160 into a correspondingly aligned recess 158 and also withdrawal are possible. For example, the engagement element 160 is pivotably arranged in the interior 88 of the holder 66, and a corresponding pivotal movement for insertion is brought about by the switch or a withdrawal can be brought about by a return pivotal movement.

In particular, spring loading is then provided, with the spring force acting such that without the exertion of force on the switch 162, the engagement element 160 is withdrawn, and a force must be explicitly applied by way of the switch 162 in order to bring about insertion.

Otherwise the support 154 functions like the support 10.

In a concrete embodiment (FIGS. 10, 11) a holder 66' is provided, on which a push element corresponding to the push element 96 in the support 10 and an actuating element corresponding to the actuating element 70 of the support 10 are provided. The same reference numerals as in the support 10 are used for these elements.

They are basically arranged in the same way as in the holder 66 of the support 10 and function in the same way.

A handle 62' is connected to the holder. Between the holder 66' and the handle 62' an engagement element 166 is pivotably arranged, for example, on the handle 62' (or the holder 66'). This engagement element 166 is held on a pivot bearing 168. The pivot bearing enables pivotal movement about a pivot axis 170, which is perpendicular to a direction of displacement of the first bar 156 in relation to a corresponding second bar.

The engagement element 166 has a nose 172 as blocking element. This nose 172 can be inserted into or withdrawn from a corresponding recess 158 of the first bar 156. A corresponding pivotal movement of the engagement element 166 brings about an insertion or a withdrawal.

The engagement element 166 is supported on the handle 62' by way of a spring device 174.

The spring device 174 which, in particular, comprises one or more spiral springs, is supported on the engagement element 166 in an area 176 facing away from an area in which the nose 172 is positioned.

The spring device 174 exerts a pressure on the engagement element 166, which presses the nose 162 in the direction of the first bar 156. If the nose 172 is located at a recess 158, the nose 172 is thereby inserted into the recess 158. A latching occurs.

For the nose 172 to withdraw from a corresponding recess 158, the force of the spring device 174 must be overcome. For this purpose, an operator must pivot the engagement element 166 accordingly so as to enable the nose 172 to move away from the first bar 156.

Accordingly, the engagement element 166 is constructed as switch 178.

In particular, the switch 178 is constructed so as to be operable with one hand, namely operable with that hand which holds the handle 62' and thereby acts on the actuating element 70.

Without operator intervention, the spring device 174, if the nose 172 is located in the area of a recess 158, causes the nose 172 to be inserted into the recess 158. This results in an automatic fixing.

Active intervention is necessary for withdrawal.

When an operator lets the engagement element 166 go, the spring device 174 then brings about a pivotal movement, and, when the first bar 156 moves, an insertion of the nose 172 into a corresponding recess 158, which, to some extent, is guided past the nose 172.

This results in an automatic locking.

Figure 10:
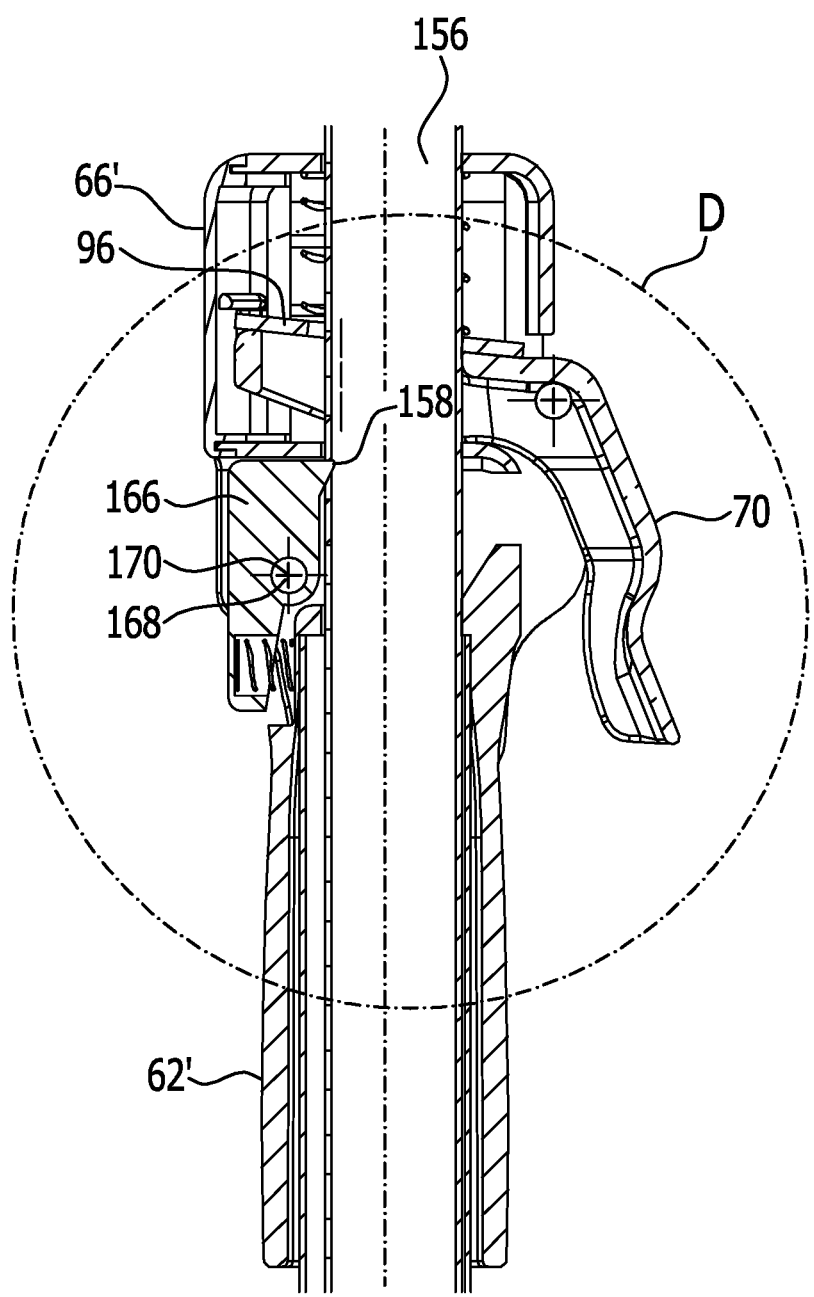
FIG. 10 a sectional view similar to FIG. 5 of a further embodiment of a support.
Figure 11:
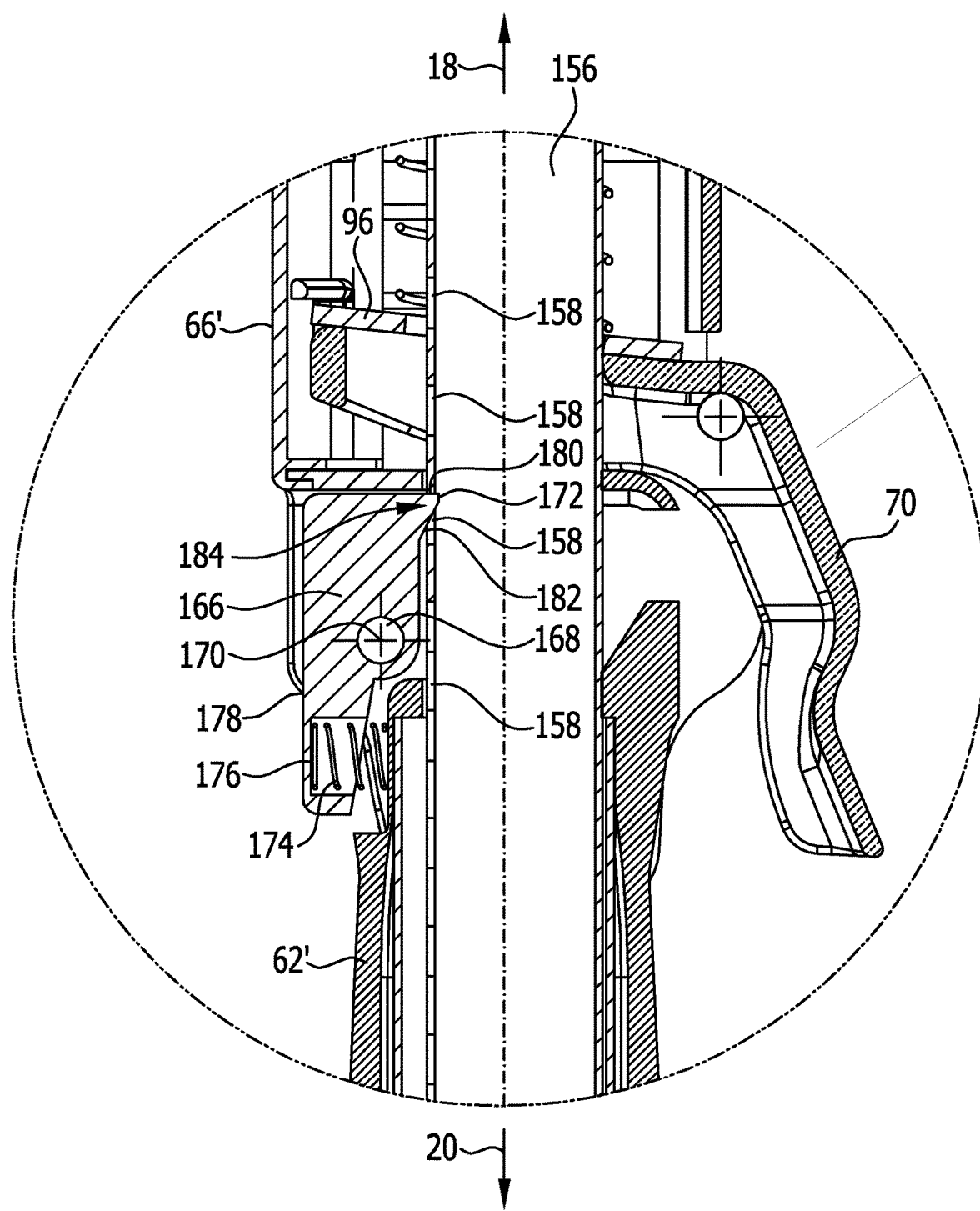
FIG. 11 an enlarged illustration of area D in accordance with FIG. 10.

In the embodiment shown in FIGS. 10 and 11, the engagement element 166 also forms a blocking device. An additional blocking device, in particular, by way of a blocking element stack such as the blocking element stack 120 is not provided.

It is, however, also possible for the engagement element 166 to be combined with an additional blocking device with a blocking element stack 120.

When operating a corresponding support, an operator, in particular, when pivoting the actuating element 70 towards the first bar 156 by acting on the switch 178, releases the blocking by way of the nose 172, so as to enable displacement of the first bar 156 in the direction of displacement 18.

In one embodiment, the nose 172 is constructed such that upon movement of the first bar 156, it is automatically guided out of the corresponding recess 158 in which it is inserted.

In particular, the nose 172 has a steep flank 180 and a sloping flank 182 connected thereto. The steep flank 180 is nearest to the first abutment element 26 in relation to the direction of displacement 18. In particular, it is orientated perpendicularly to the first direction of displacement 18. The sloping flank 182 forms an inclined plane.

When the nose 172 is inserted in a recess 158, withdrawal of the nose 172 from the recess 158 can then be brought about by movement of the first bar 156 by way of the push element 96 owing to the sloping flank 182 (as inclined plane) so as to enable the displacement in the first direction of displacement 18.

A withdrawal, when the first bar 156 moves or is moved in the second direction of displacement 20, is only possible by active intervention of the operator at the engagement element 166, i.e., an active pivoting of the nose 172 out of the corresponding recess 158 is necessary.

The force exerted on the sloping flank 182 upon movement in the first direction of displacement 18 (caused by the actuating element 70) brings about a pivoting of the engagement element 166 counter to the force of the spring device 174, which results in a withdrawal of the nose 172 from the corresponding recess 158.

A support is thereby obtained, which is operable with one hand and in which a corresponding blocking device 184 is formed by the engagement element 166, which brings about a blocking in the second direction of displacement 20.

When the first bar 156 is moved up in the first direction of displacement 18, the nose is "dragged along" an outer side of the first bar 156 between adjacent recesses 158. When the nose 172 lies over a recess 158, it is then inserted into it owing to the force of the spring device 174 and in this position brings about a blocking in the second direction of displacement 20 by means of latching. A latched position is created.

When further displacement occurs in the first direction of displacement 18 (by further actuation or actuation again of the actuating element 70) then the nose 172 can withdraw again, etc., as described below.

Otherwise the support functions as described above.

The support 10 and 154, respectively, in accordance with the invention functions as follows:

To provide a support at an object between a first wall and a second wall, with the support 10 and 154, respectively, positioned between the first wall and the second wall, an operator grasps the support 10 and 154, respectively, at the handle 62.

The support 10 and 154, respectively, comprises an actuating device 164, which includes the actuating element 70, the lever element 86, the push element 96 and the blocking device 114. The actuating device 164 is operable by way of the actuating element 70 when the support 10 and 154, respectively, is grasped at the handle 62. In particular, the actuating element 70 is then operable by way of the index finger or thumb of the holding hand. The operator can thereby hold the support 10 in its entirety at the handle 62. He can actuate the actuating device 164 and thereby displace the first bar 12 in the first direction of displacement 18. He can thereby bring about abutment of the first abutment element 26 and the second abutment element 46 against the corresponding wall. He sets a pretension.

The first bar 12 is displaced in the first direction of displacement 18 by pumping the actuating device 164. An operator moves the actuating element 70 in the first pivotal direction 80 actively. The push element 96 is thereby transferred from its initial position 104 to an advanced position 108 on the first bar 12. The first bar 12 is taken along by the pivotal movement over a certain distance in the first direction of displacement 18 owing to corresponding displacement of the push element 96 clamped to it.

When the operator exerts no force on the actuating element 70, the force of the first spring device 95 then sets the actuating element 70 back by pivotal movement in the second pivotal direction 82. By repeated "pumping" the first bar 12 of the support 10 and 154, respectively, is thereby extended step by step in relation to the second bar 14.

When the first abutment element 26 and the second abutment element 46 lie against the corresponding wall, an increased supporting force can be applied by rotating the support 10 and thereby by rotating the combination of first bar 12 and second bar 14. This force is introduced by way of the first thread 32 and the second thread 48.

A high force, for example, of 4000 N in size can be introduced by way of this rotation and by way of the threads 32, 48.

Here one-hand operation is possible. Abutment of the first abutment element 26 and the second abutment element 46 can be ensured by the corresponding pumping operation and the actual high force is then introduced by rotating the combination of first bar 12 and second bar 14 with the threads 32, 48 of opposite direction.

This results in a high degree of operating convenience since, as mentioned above, one-hand operation is possible.

A displacement of the first bar 12 in relation to the second bar 14 in the second direction of displacement 20 is possible when the blocked position 128 in the blocking device 114 is released by acting accordingly on the release grip 140.

When the first bar 12 is driven into the second bar 14 and, in particular, when the first bar 12 falls down in the second bar 14 owing to the action of the force of gravity, the elastic stop device 152 prevents hard striking. The striking is damped by the elastic stop device 152. A high degree of operating convenience is achieved.

The blocking device 114 can be released, in particular, also by the same hand as that which holds the handle 62 and, for example, with which the pumping movement at the actuating device 164 was previously carried out.

On the one hand, one-hand operation can be achieved with the support 10 and 154, respectively, in accordance with the invention. Abutment of the first abutment element 26 and the second abutment element 46 with pretension against the object can be achieved by the pumping operation. The final force is then introduced by rotation. On the other hand, large forces can then be introduced by way of the rotation.

A high load bearing capacity of the support 10 and 154, respectively, with a high degree of operating convenience is thereby achieved. An operator essentially has the other hand free to hold, for example, the object or parts of the object.

The blocking element stack 120 and 144, respectively, secures in a clamped position the position of the first bar 12 on the second bar 14 in relation to the second direction of displacement 20.

With the support 154, this position can be secured by a positively locking connection of the engagement element 160 at a corresponding recess 158.

In the case of the support 154, when the engagement element 160 correspondingly engages a recess 158, an increased supporting force can be set or a further clamping achieved by corresponding rotation of the combination of first bar 156 and second bar 14.

In accordance with the invention, a support is provided, which, for example, can be used as ceiling prop, which with high force bearing capacity enables one-hand operation. A high transfer of force to the object is possible, and, furthermore, a high load force at the support 10 and 154, respectively, is also possible.

The support which comprises the actuating device in accordance with FIGS. 10 and 11 functions, in principle, in the same way as explained above. There the blocking device 184 is formed solely by way of the engagement element 166. A blocking element stack such as the blocking element stack 144 or 120 is not provided, but it can also be used additionally.

The way in which a corresponding support with engagement element 166 functions was already described above with respect to the blocking for a displacement in the second direction of displacement 20.

With respect to the displacement in the first direction of displacement 18, such a support functions in the same way as, for example, the support 10.

LIST OF REFERENCE NUMERALS 10 support
12 first bar
14 second bar
16 guiding device
18 first direction of displacement
20 second direction of displacement
22 plunge-in area
24 end
26 first abutment element
28 plate
30 profile
32 first thread
34 lug device
36 pin
38 pivot bearing
40 pivot axis
42 insert
44 end
46 second abutment element
48 second thread
52 insert
54 plate
56 lug device
58 pin
60 pivot bearing
62 handle
62' handle
64 sleeve
66 holder
66' holder
68 through-opening
70 actuating element
72 pivot bearing
74 pivot axis
76 rib
78 shaft
80 first pivotal direction
82 second pivotal direction
84 finger placement hollow
86 lever element
88 interior
90 transverse element
92 longitudinal element
94 opening
95 first spring device
96 push element
98 center plane
100 through-opening
102 side
104 initial position
105 second acute angle
106 perpendicular plane
108 advanced position
110 first acute angle
112 guiding element
114 blocking device
116 second spring device
118 blocking element
120 blocking element stack
122 center plane
124 abutment
126 pivot axis
128 blocked position
130 acute angle
132 third spring device
134 through-opening
136 wall
138 stop
140 release grip 142 opening
144 blocking element stack
146 actuating element
148 lever element
150 release grip
152 elastic stop device
153 annular surface
154 support
156 first bar
158 recess
160 engagement element
162 switch
164 actuating device
166 engagement element
168 pivot bearing
170 pivot axis
172 nose
174 spring device
176 area
178 switch
180 steep flank
182 sloping flank
184 blocking device

What is claimed is:

1. Support, comprising:
   a first bar;
   a first abutment element which is held on the first bar by means of a first thread with a first thread direction;
   a second bar;
   a second abutment element which is held on the second bar by means of a second thread with a second thread direction, the first thread direction being opposite to the second thread direction; and
   a guiding device by which the first bar is displaceably guided on the second bar;
   wherein:
     an actuating device which acts on the first bar and which comprises an actuating element is arranged on the second bar, it being possible for a displacement of the first bar in a first direction of displacement to be initiated by actuation of the actuating element, and the first direction of displacement being a direction of increase in distance between the first abutment element and the second abutment element;
     the actuating device comprises a blocking device which blocks a displacement of the first bar in relation to the second bar in a second direction of displacement, which is opposite to the first direction of displacement, at least when no active releasing action occurs at the blocking device; and
     a handle which can be gripped with a single hand and by means of which the combination of first bar and second bar can be rotated is arranged on the second bar.

2. Support in accordance with claim 1, wherein the actuating element is or comprises a lever element or is coupled to a lever element which is arranged on the second bar for pivotal movement about a pivot axis.

3. Support in accordance with claim 2, wherein the pivot axis is orientated transversely to the first direction of displacement.

4. Support in accordance with claim 2, wherein at least one of the actuating element and the lever element is arranged on a holder which is fixed to the second bar.

5. Support in accordance with claim 4, wherein a pivot bearing on which at least one of the actuating element and the lever element is mounted for pivotal movement is arranged on an outer side of the holder.

6. Support in accordance with claim 4, wherein the holder is constructed as sleeve.

7. Support in accordance with claim 4, wherein the holder has a through-opening through which the first bar passes.

8. Support in accordance with claim 4, wherein the holder is arranged on a handle positioned on the second bar.

9. Support in accordance with claim 1, wherein the handle is constructed as sleeve which is seated on the second bar and surrounds the second bar.

10. Support in accordance with claim 1, wherein the actuating element is arranged in relation to the handle such that when holding the support at the handle with a holding hand, the actuating element is actuatable with one or more fingers of the holding hand.

11. Support in accordance with claim 10, wherein the actuating element comprises a finger placement hollow.

12. Support in accordance with claim 2, wherein the actuating device comprises at least one push element which acts on the first bar, and the lever element acts on the at least one push element.

13. Support in accordance with claim 12, wherein the at least one push element has an initial position or an initial position range in relation to the first bar in which the first bar is displaceable in relation to the at least one push element and the second bar.

14. Support in accordance with claim 13, wherein the at least one push element has an advanced position or an advanced position range in which the at least one push element is clamped to the first bar, it being possible for the at least one push element to be brought from the initial position or the initial position range into the advanced position or the advanced position range by a pivotal movement of the lever element in a first pivotal direction.

15. Support in accordance with claim 14, wherein the actuating device is constructed such that starting from the advanced position or the advanced position range of the at least one push element, a further pivoting of the lever element in the first pivotal direction moves the at least one push element and, owing to the clamping, the first bar relative to the second bar in a translatory manner in the first direction of displacement.

16. Support in accordance with claim 14, wherein the at least one push element is spring-loaded, with a corresponding spring device being arranged and constructed such that it endeavors to bring the at least one push element from the advanced position or the advanced position range into the initial position or the initial position range.

17. Support in accordance with claim 14, wherein at least one of the lever element and the actuating element is spring-loaded, with a corresponding spring device being arranged and constructed such that it endeavors to move at least one of the lever element and the actuating element in a second pivotal direction opposite to the first pivotal direction.

18. Support in accordance with claim 14, wherein when pivoting the lever element in the first pivotal direction, the actuating element is moved towards the second bar.

19. Support in accordance with claim 14, wherein the at least one push element is of plate-shaped construction with a center plane, and in the advanced position or the advanced position range the center plane is orientated at a first acute angle to a perpendicular plane to the first direction of displacement, and in the initial position or in the initial position range is orientated at least approximately parallel to this perpendicular plane or at a second acute angle, which is smaller than the first acute angle.

20. Support in accordance with claim 12, wherein the at least one push element has a through-opening through which the first bar passes.

21. Support in accordance with claim 1, wherein the blocking device is releasable and, without release, a displacement of the first bar relative to the second bar in the second direction of displacement is blocked, and, with release, a displacement of the first bar in the second direction of displacement is unblocked.

22. Support in accordance with claim 21, wherein the blocking device comprises at least one blocking element which is clampable or latchable to the first bar.

23. Support in accordance with claim 22, wherein the at least one blocking element is arranged for pivotal movement relative to the first bar, and, in dependence upon a pivotal position, the at least one blocking element is in a clamped position or latched position on the first bar or the first bar is released.

24. Support in accordance with claim 23, wherein upon a displacement movement of the first bar in the first direction of displacement by means of the actuating element, the at least one blocking element is brought out of a clamped position or latched position into a released position by the displacement of the first bar.

25. Support in accordance with claim 22, wherein in a clamped position or in a clamped position range, the at least one blocking element lies in relation to a center plane at an acute angle to a perpendicular plane to the first direction of displacement, this acute angle having an opposite sign in comparison with an acute angle of a push element for initiating a movement in the first direction of displacement when this push element is in a clamped position on the first bar.

26. Support in accordance with claim 22, wherein the at least one blocking element is of plate-shaped construction.

27. Support in accordance with claim 22, wherein the at least one blocking element has a through-opening through which the first bar passes.

28. Support in accordance with claim 22, wherein a blocking element stack consisting of a plurality of blocking elements is provided.

29. Support in accordance with claim 22, wherein the at least one blocking element is spring-loaded, with a corresponding spring device being arranged and constructed such that it endeavors to bring the at least one blocking element into its blocked position.

30. Support in accordance with claim 22, wherein a release grip which acts on the at least one blocking element is provided.

31. Support in accordance with claim 30, wherein the release grip is positioned such that it is actuatable with one-hand operation when the support is held with a corresponding hand.

32. Support in accordance with claim 30, wherein the release grip is arranged on a side that faces away from a side on which the actuating element is arranged.

33. Support in accordance with claim 30, wherein the release grip is arranged between a push element of the actuating device and the second abutment element.

34. Support in accordance with claim 30, wherein the release grip is arranged between a push element of the actuating device and the first abutment element.

35. Support in accordance with claim 1, wherein the second bar has a plunge-in area for the first bar, and the first bar is guided in the plunge-in area.

36. Support in accordance with claim 35, wherein a damper for the first bar is arranged in the plunge-in area at an end facing the second abutment element.

37. Support in accordance with claim 1, wherein the first bar is provided with recesses, and in that the actuating device comprises at least one engagement element which is insertable into a recess.

38. Support in accordance with claim 37, wherein the at least one engagement element is arranged on a holder for the actuating element.

39. Support in accordance with claim 37, wherein the actuating device comprises a switch which acts on the at least one engagement element and by means of which the at least one engagement element is insertable into and withdrawable from a recess.

40. Support in accordance with claim 39, wherein the switch is arranged so as to be operable with that hand which holds the support.

41. Support in accordance with claim 1, wherein the first bar is arranged in a rotationally fixed manner on the second bar.

42. Support, comprising:
a first bar;
a first abutment element which is held on the first bar by means of a first thread with a first thread direction;
a second bar;
a second abutment element which is held on the second bar by means of a second thread with a second thread direction, the first thread direction being opposite to the second thread direction; and
a guiding device by which the first bar is displaceably guided on the second bar;
wherein:
an actuating device which acts on the first bar and which comprises an actuating element is arranged on the second bar, it being possible for a displacement of the first bar in a first direction of displacement to be initiated by actuation of the actuating element, and the first direction of displacement being a direction of increase in distance between the first abutment element and the second abutment element;
the actuating device comprises a blocking device which blocks a displacement of the first bar in relation to the second bar in a second direction of displacement, which is opposite to the first direction of displacement, at least when no active releasing action occurs at the blocking device;
the actuating element is or comprises a lever element or is coupled to a lever element which is arranged on the second bar for pivotal movement about a pivot axis;
at least one of the actuating element and the lever element is arranged on a holder which is fixed to the second bar; and
the holder is arranged on a handle positioned on the second bar.

43. Support, comprising:
a first bar;
a first abutment element which is held on the first bar by means of a first thread with a first thread direction;
a second bar;
a second abutment element which is held on the second bar by means of a second thread with a second thread direction, the first thread direction being opposite to the second thread direction; and
a guiding device by which the first bar is displaceably guided on the second bar;

wherein:
- an actuating device which acts on the first bar and which comprises an actuating element is arranged on the second bar, it being possible for a displacement of the first bar in a first direction of displacement to be initiated by actuation of the actuating element, and the first direction of displacement being a direction of increase in distance between the first abutment element and the second abutment element;
- the actuating device comprises a blocking device which blocks a displacement of the first bar in relation to the second bar in a second direction of displacement, which is opposite to the first direction of displacement, at least when no active releasing action occurs at the blocking device;
- the blocking device is releasable and, without release, a displacement of the first bar relative to the second bar in the second direction of displacement is blocked, and, with release, a displacement of the first bar in the second direction of displacement is unblocked;
- the blocking device comprises at least one blocking element which is clampable or latchable to the first bar;
- a release grip which acts on the at least one blocking element is provided; and
- the release grip is positioned such that it is actuatable with one-hand operation when the support is held with a corresponding hand.

44. Support in accordance with claim 43, wherein the release grip is arranged between a push element of the actuating device and the second abutment element.

45. Support in accordance with claim 43, wherein the release grip is arranged between a push element of the actuating device and the first abutment element.

46. Support in accordance with claim 42, wherein a handle which can be gripped with a single hand and by means of which the combination of first bar and second bar can be rotated is arranged on the second bar.

* * * * *